(12) United States Patent
Barsness et al.

(10) Patent No.: US 10,175,962 B2
(45) Date of Patent: *Jan. 8, 2019

(54) JOINING OPERATOR GRAPH ELEMENTS VIA WHOLE PROGRAM OPTIMIZATION

(71) Applicant: International Business Machines Corporation, Armonk, NY (US)

(72) Inventors: Eric L. Barsness, Pine Island, MN (US); Michael J. Branson, Rochester, MN (US); James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,046

(22) Filed: Jul. 2, 2015

(65) Prior Publication Data

US 2016/0364218 A1    Dec. 15, 2016

Related U.S. Application Data

(63) Continuation of application No. 14/735,337, filed on Jun. 10, 2015.

(51) Int. Cl.
*G06F 8/41*        (2018.01)
*G06F 9/46*        (2006.01)

(52) U.S. Cl.
CPC ............... *G06F 8/43* (2013.01); *G06F 8/41* (2013.01); *G06F 9/46* (2013.01)

(58) Field of Classification Search
CPC ............... G06F 8/43; G06F 8/41; G06F 9/46

USPC .................. 717/151, 154, 155, 156, 157
See application file for complete search history.

(56) References Cited

U.S. PATENT DOCUMENTS

| | | | | |
|---|---|---|---|---|
| 5,978,786 A | * | 11/1999 | Eyles ..................... | G06N 5/046 706/46 |
| 6,874,078 B2 | * | 3/2005 | Pechanek .............. | G06F 9/3012 712/213 |
| 8,074,219 B2 | * | 12/2011 | Duffy ..................... | G06F 8/456 707/696 |
| 8,407,360 B2 | * | 3/2013 | Andrade ............... | G06F 9/5066 709/231 |
| 8,683,455 B1 | * | 3/2014 | Tallam .................. | G06F 8/4435 717/106 |
| 8,732,300 B2 | * | 5/2014 | Barsness ........... | G06F 17/30516 709/223 |
| 9,063,788 B2 | * | 6/2015 | Gedik .................. | G06F 9/5066 |

(Continued)

OTHER PUBLICATIONS

Kempf et al., "Multiprocessor SAystems on Chip: Design Space Exploration", 2011.*

(Continued)

*Primary Examiner* — Hossain M Morshed
(74) *Attorney, Agent, or Firm* — Patterson + Sheridan, LLP

(57) ABSTRACT

Techniques disclosed herein describe joining processing elements (e.g., of a streams processing environment) using optimization techniques, such as by whole program optimization. An optimization tool evaluates multiple processing elements based on one or more optimization rules. The optimization tool identifies, based on the evaluation, processing elements that can be merged. The optimization tool joins the identified processing elements together.

20 Claims, 6 Drawing Sheets

(56) References Cited

U.S. PATENT DOCUMENTS

| | | | |
|---|---|---|---|
| 2007/0294663 A1* | 12/2007 | McGuire | G06F 8/45 717/108 |
| 2009/0007116 A1 | 1/2009 | Duffy et al. | |
| 2009/0106214 A1* | 4/2009 | Jain | G06F 17/30516 |
| 2011/0061060 A1* | 3/2011 | Andrade | G06F 9/5066 719/313 |
| 2011/0088035 A1* | 4/2011 | Etzion | G06F 17/30551 718/102 |
| 2011/0093491 A1* | 4/2011 | Zabback | G06F 17/30451 707/769 |
| 2012/0047467 A1* | 2/2012 | Pfeifer | G06F 11/3006 715/853 |
| 2013/0031335 A1* | 1/2013 | Santosuosso | H04L 65/608 712/30 |
| 2013/0054779 A1* | 2/2013 | Cradick | G06F 15/173 709/224 |
| 2013/0091507 A1* | 4/2013 | Wu | G06F 9/5038 718/104 |
| 2013/0198489 A1* | 8/2013 | Branson | G06F 9/44 712/200 |
| 2013/0219370 A1* | 8/2013 | Beale | G06F 11/3466 717/128 |
| 2013/0262839 A1* | 10/2013 | Gschwind | G06F 9/30181 712/226 |
| 2014/0081896 A1* | 3/2014 | Ranganathan | G06N 5/02 706/48 |
| 2014/0095503 A1 | 4/2014 | Branson et al. | |
| 2014/0122559 A1* | 5/2014 | Branson | H04L 67/02 709/201 |

OTHER PUBLICATIONS

IBM, "IBM InfoSphere Streams Version 3.2.1: Operator granularity", 2014, located at https://www.ibm.com/support/knowledgecenter/en/SSCRJU_.2.1/com.ibm.swg.im.infosphere.streams.dev.doc/str_opgran.html.*

International Business Machines Corporation: "Appendix P: List of IBM Patents or Patent Applications Treated as Related", Jul. 2, 2015.

\* cited by examiner

JOINING OPERATOR GRAPH ELEMENTS VIA WHOLE PROGRAM OPTIMIZATION

CROSS-REFERENCE TO RELATED APPLICATION

This application is a continuation of co-pending U.S. patent application Ser. No. 14/735,337, filed Jun. 10, 2015. The aforementioned related patent application is herein incorporated by reference in its entirety.

BACKGROUND

Embodiments presented herein generally relate to distributed computing, and more specifically, to optimizing an operator graph of a distributed application (e.g., of a streams processing environment).

In a streams processing environment, multiple nodes in a computing cluster execute a distributed application. The distributed application retrieves a stream of input data from a variety of data sources and analyzes the stream. A stream is composed of data units called "tuples," which is a list of attributes. Further, the distributed application includes processing elements that are distributed across the cluster nodes. Each processing element, or operator, may perform a specified task associated with a tuple. Each processing element receives one or more tuples as input and processes the tuples through the operators. Once performed, the processing element may output one or more resulting tuples to another processing element, which in turn performs a specified task on those tuples, and so on.

Further, a developer of the distributed application may design an operator graph using an integrated design environment (IDE) tool. The operator graph specifies a desired configuration of processing elements and operators in the streams processing environment. The IDE tool may provide pre-defined operators for use in the operator graph. For example, a source processing element may read and extract information from files obtained from a data source. As another example, a functor processing element may manipulate the information extracted from files. In addition, a developer for the distributed application can create custom processing elements to perform a given task. In addition, the developer may create custom operators, specifying functions for a given operator to perform. The functions can specify a given task to perform and a destination processing element for tuple output.

SUMMARY

Embodiments presented herein describe a method. The method generally includes evaluating a plurality of processing elements organized in an operator graph. The plurality of processing elements includes at least a first processing element and a second processing element. The method also includes determining, based on the evaluation, that the first processing element and the second processing element satisfy at least one optimization rule. The first processing element is joined with the second processing element.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
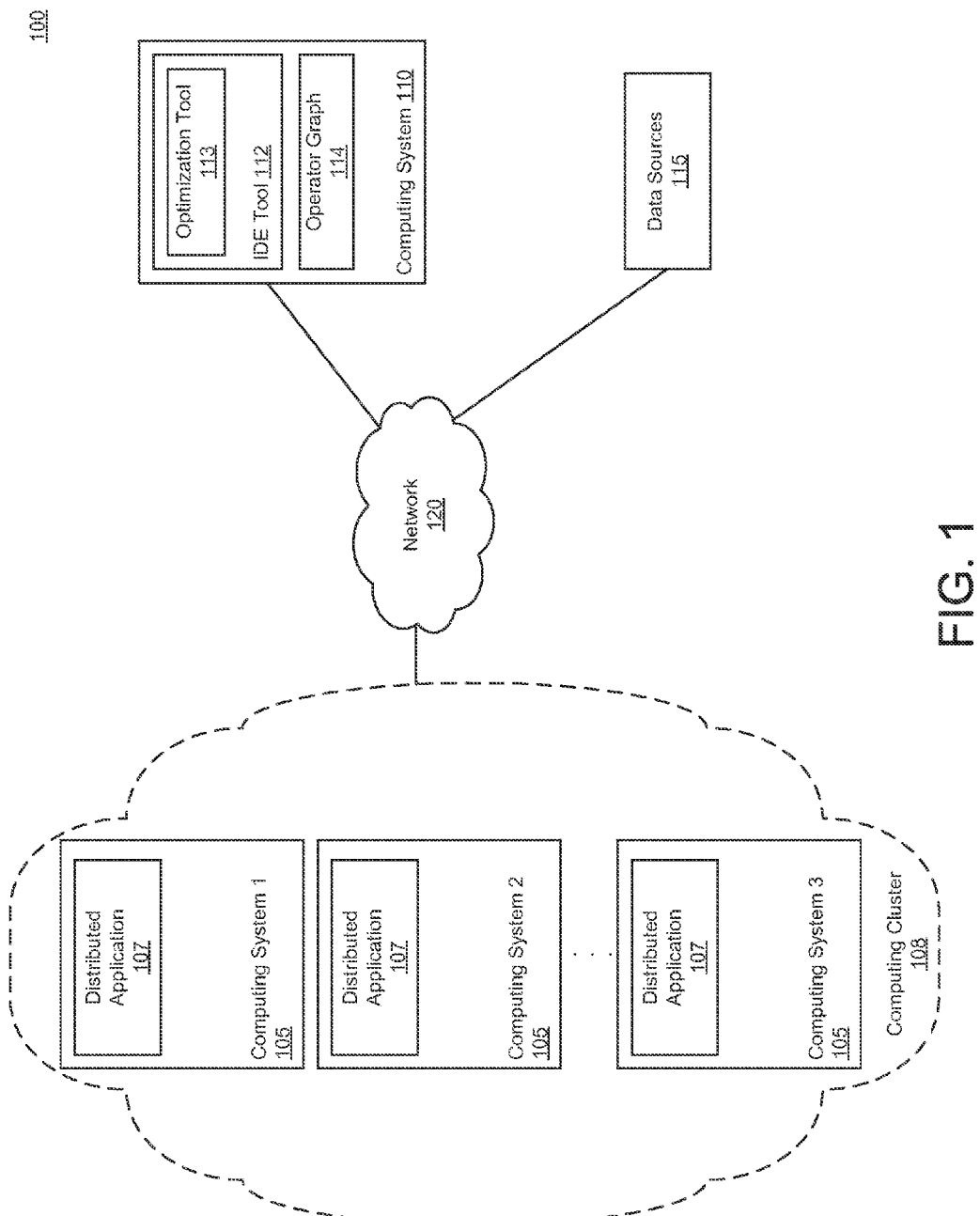
FIG. 1 illustrates an example computing environment, according to one embodiment.

Embodiments presented herein describe techniques for optimizing an operator graph. In one embodiment, a distributed application executes in a computing cluster of a streams processing environment. Processing elements of the distributed application execute on the nodes and retrieve streams of input called "tuples," which is a list of input attributes. Each processing element performs a specified task on the tuples and output resulting tuples to other processing elements deployed in the streams processing environment. Each processing element executes as an independent process in an operating system of a cluster node that is triggered when data is sent to that processing element (e.g., by another processing element).

Further, a developer may construct, through an integrated design environment (IDE) tool, an operator graph that specifies a desired configuration of processing elements in the streams processing environment. The IDE tool provides predefined processing elements that each perform a given task. For example, a source processing element reads files extracted from a particular source. As another example, a functor processing element manipulates input data. Further, the IDE tool allows the developer to create customized processing element that perform a specified task. Once complete, the developer can compile the operator graph in the IDE tool for deployment in the streams processing environment via the distributed application.

Although traditional compiler optimizations can simplify some aspects of the operator graph during compilation, such techniques are more focused towards an executable, without consideration streams processing environment. Because each processing element is an independent process executing in a node of the streams processing environment, a developer may be concerned about efficiency between processing elements. For instance, assume that processing elements A, B, and C are connected in succession. Each of A, B, and C correspond to a functor processing element that transforms fields of a given input tuple. For example, A transforms a first field of the tuple and passes the resulting tuple to B. B transforms a second field of that tuple and passes the resulting tuple to C, and so on. After each transformation, the distributed application calls the next processing element to perform the specified task. Thus, it may be more efficient for a single processing element to transform the specified fields.

In one embodiment, the IDE provides an optimization tool. At compilation of an operator graph, the optimization tool identifies processing elements that can be merged based on a set of optimization rules. Further the optimization tool applies whole program optimization techniques to the operator graph. That is, rather than evaluating an individual processing element piecemeal, the optimization tool may evaluate the processing element relative to the placement of the processing element in the graph, to other processing elements in the graph, etc. For instance, the optimization tool may evaluate a given processing element based on the task specified and the type of function that the processing element performs. The optimization tool may determine, based on the set of rules, that the processing element can be combined with a successive processing element that performs an identical function. The optimization tool may then join the processing elements together. That is, the optimization tool may merge the underlying code instructions together such that the tasks are performed by one processing element (e.g., removing duplicate code performed on a by a pair of processing elements). As a result, the underlying code instructions may be interleaved with one another.

Further, in one embodiment, the optimization tool may recommend, to the developer, processing elements of the operator graph that can be merged. In one embodiment, the IDE tool occasionally pre-compiles an operator graph in progress, e.g., at specified intervals during the design, after the developer saves the operator graph, etc. When the IDE tool pre-compiles the operator graph, the IDE tool may save compiler artifacts corresponding to the processing elements, such as instruction code and symbols, that the optimizer tool can evaluate. The optimizer tool evaluates such artifacts based on specified rules. The optimizer tool identifies, based on the evaluation, processing elements that can be merged (i.e., the underlying code instructions can be performed by a single processing element). The optimizer tool may indicate, to the developer (e.g., via a graphical user interface), processing elements in the operator graph that can be merged. In turn, the developer may select which of the identified processing elements to merge. The optimizer tool receives the selection and merges the selected processing elements.

Advantageously, automatically identifying processing elements that may be merged provides increased efficiency to the streams processing environment. That is, by merging processing elements in the operator graph, the distributed application manages fewer processes. Further, the techniques described herein evaluate an operator graph as a whole. As a result, processing elements are not required to be in succession with one another for the optimization tool to identify that those processing elements can be merged.

Note, the following describes a distributed application of a streams processing environment as a reference example of an application executing in a cluster of computing nodes, where processing elements in each node perform some task that results in data being output to other processing elements. However, one of skill in the art will recognize that embodiments presented herein may be adapted to a variety of applications having processing elements that perform tasks that can be merged into a single processing element.

FIG. 1 illustrates an example computing environment 100, according to one embodiment. As shown, computing environment 100 includes a computing cluster 105, a computer system 110, and one or more data sources 115. The computing cluster 105, computing system 110, and data sources 115 are each connected via a network 120 (e.g., the Internet).

In one embodiment, the computing cluster 105 includes multiple computing nodes 107. Each computing node may be a physical computing system or a virtual machine instance executing in a cloud computing environment. The nodes 107 each execute a distributed application 109. The distributed application 109 retrieves input streams of data from various data sources 115, e.g., over the network 120. Examples of such data include message data, XML documents, biometric data captured from an individual in real-time, etc. The distributed application 109 many analyze the input streams in manageable data units called "tuples." A tuple is a list of attributes. Further, the distributed application 109 includes processing elements executing on various nodes that perform a specified task using tuples as input. Tuples flow from processing element to processing element in the streams processing environment. Each processing element executes as an independent process in an operating system of a cluster node.

The computer system 110 may be a physical computing system or a virtual machine instance in a cloud environment. In one embodiment, the computer system 110 includes an integrated development environment (IDE) tool 112. A developer in the streams processing environment may configure processing elements via the IDE tool 112, e.g., to specify which particular nodes to execute a given processing element, to specify a function of a given processing element, to specify a flow of tuples between processing elements, etc. The developer may also specify a given type of processing element. For example, a source processing element reads files extracted from a particular source. As another example, a functor processing element manipulates input data. Further, the IDE tool 112 allows the developer to create customized processing element that perform a specified task.

In one embodiment, the IDE tool 112 allows a developer to design an operator graph 114. The operator graph 114 specifies a desired configuration of processing elements in the streams processing environment. The IDE tool 112 may provide a graphical display of the operator graph, which allows the developer to more easily create a flow between processing elements in the streams processing environment. The IDE tool 112 may compile an operator graph to computer-readable instructions. The distributed application 112 may then execute such instructions.

As shown, the IDE tool 112 includes an optimization tool 113. In one embodiment, the optimization tool 113 evaluates the computer-readable instructions generated by the IDE tool 112. The optimization tool 113 identifies, based on the evaluation, processing elements in the operator graph 114 that can be joined, e.g., where instruction code can be interleaved with one another or otherwise removed. The optimization tool 113 includes one or more rules used to identify cases in which a processing element should be joined with another. As an example, such rules may specify that if a given processing element performs a function to a first field of a tuple and if another processing element performs the identical function to a second field of that tuple, then the processing elements should be merged. Another rule may specify that certain source processing elements be merged where possible (e.g., no conflicts between tuples exist). Advantageously, the resulting code for a merged processing element is interleaved code between the two or more original processing elements.

Figure 2:
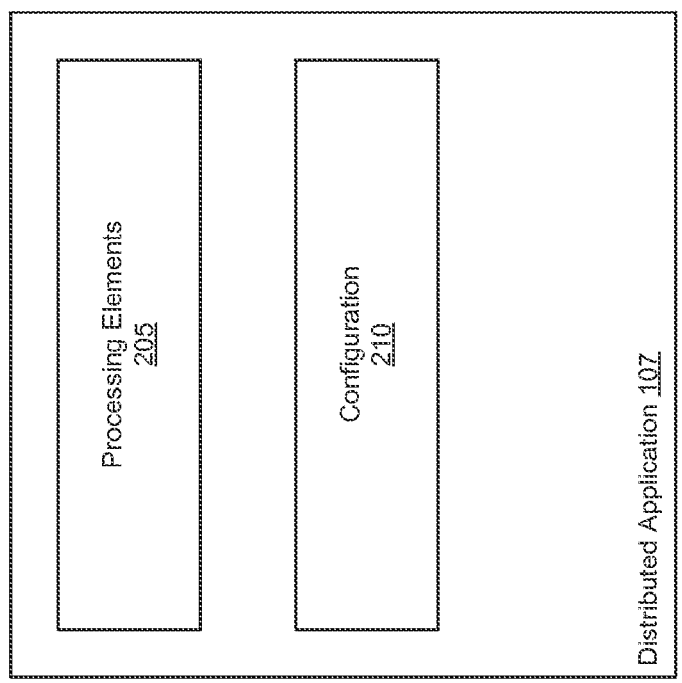
FIG. 2 further illustrates the distributed application described relative to FIG. 1, according to one embodiment.

FIG. 2 further illustrates the distributed application 107, according to one embodiment. As shown, the distributed application 107 includes one or more processing elements 205 and a configuration 210.

As stated, processing elements 205 may be distributed to various nodes in the computing cluster 105. Each processing element 205 includes one or more operators. Each operator may perform a subset of the specified task associated with the processing element. For example, one operator may receive a tuple that consists of comma-delineated text values. The operator may determine the number of times a given term appears in the tuple and send the result to another operator, in addition to other specified information.

The configuration 210 specifies properties of the streams processing environment. For example, such properties may describe which node a given processing element 205 is located, a specified flow of data between processing elements 205, address information of each node, identifiers for processing elements 205, and the like.

Figure 3:
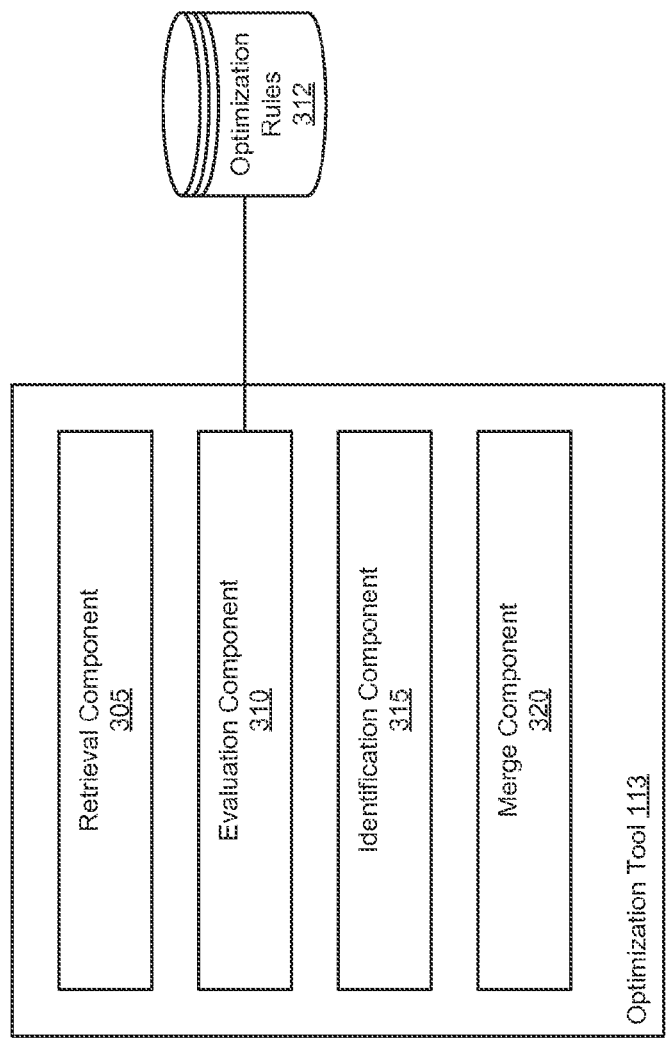
FIG. 3 further illustrates the optimization tool described relative to FIG. 1, according to one embodiment.

FIG. 3 further illustrates the optimization tool 113, according to one embodiment. As shown, the optimization tool 109 includes a retrieval component 305, an evaluation component 310, an identification component 315, and a merge component 320.

In one embodiment, the retrieval component 305 obtains instruction code associated with the operator graph 114. Such instruction code may be generated by a compiler of the IDE tool 112, e.g., by the developer selecting a compile option of the IDE tool 112, by the developer saving the operator graph 114, etc.

In one embodiment, the evaluation component 310 analyzes the instruction code associated with the operator graph 114. The evaluation component 310 does so based on a set of optimization rules 312. The optimization rules 312 are used to identify cases in which a processing element should be joined with another. For example, such rules may specify that if a given processing element performs a function to a first field of a tuple and if another processing element performs the identical function to a second field of that tuple, then the processing elements should be merged. Another rule may specify that certain source processing elements be merged where possible (e.g., no conflicts between tuples exist). Another rule may specify situations in which processing elements of different types should be joined (e.g., a source processing element to a functor processing element, a functor processing element to a custom processing element, etc.).

In one embodiment, the identification component 315 determines, from the analysis performed by the evaluation component 310, which processing elements in the operator graph can be joined together. Further, the identification component 315 may generate an indication of such processing elements, e.g., to display to the developer as a join recommendation via the IDE tool 112.

In one embodiment, the merge component 320 joins processing elements identified in the operator graph to be joinable. To do so, the merge component 320 may consolidate instruction code from two or more processing elements to be performed in a single processing element. For example, the merge component 320 may remove duplicate code in multiple processing elements, e.g., where processing elements A and B each transform a field X, the resulting code may be such that only one transformation to the field X is performed. Further, in one embodiment, the merge component 320 may receive a selection of processing elements identified to be joinable (e.g., during the design phase of the operator graph). The merge component 320 may join the selected processing elements. Doing so results in interleaved instruction code.

Figure 4:
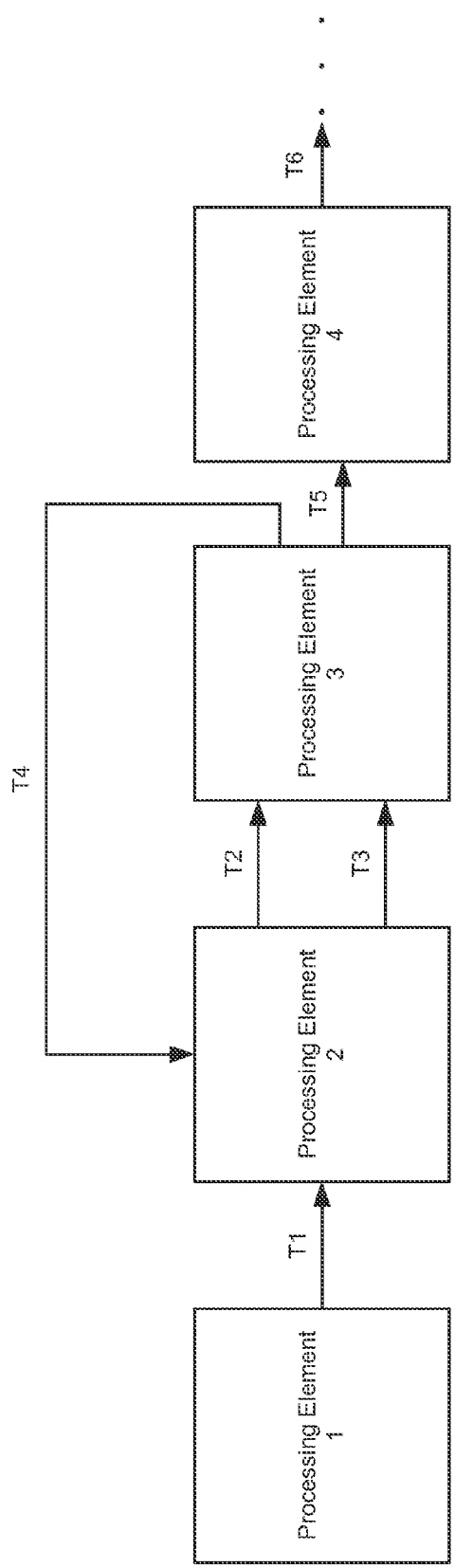
FIG. 4 illustrates an example operator graph, according to one embodiment, according to one embodiment.

FIG. 4 illustrates an example operator graph 400, according to one embodiment. As stated, a developer can configure processing elements through an operator graph using the IDE tool 112. For example, the IDE tool 112 allows the developer to determine in which nodes to place each processing element, functions that each operator in the processing element performs, tuple destination processing elements, etc.

In this example, FIG. 4 depicts four processing elements 1-4. Illustratively, each processing element outputs tuples (T1-T6) to other processing elements. For example, processing element 1 outputs a tuple T1 to processing element 2. Processing element 2 performs a specified function on the tuple T1 and outputs tuples T2 and T3 to processing element 3. Further, processing elements may output tuples to different destination processing elements. As illustrated, processing element 3 outputs tuple T4 to processing element 2 and tuple T5 to processing element 4.

Figure 5:
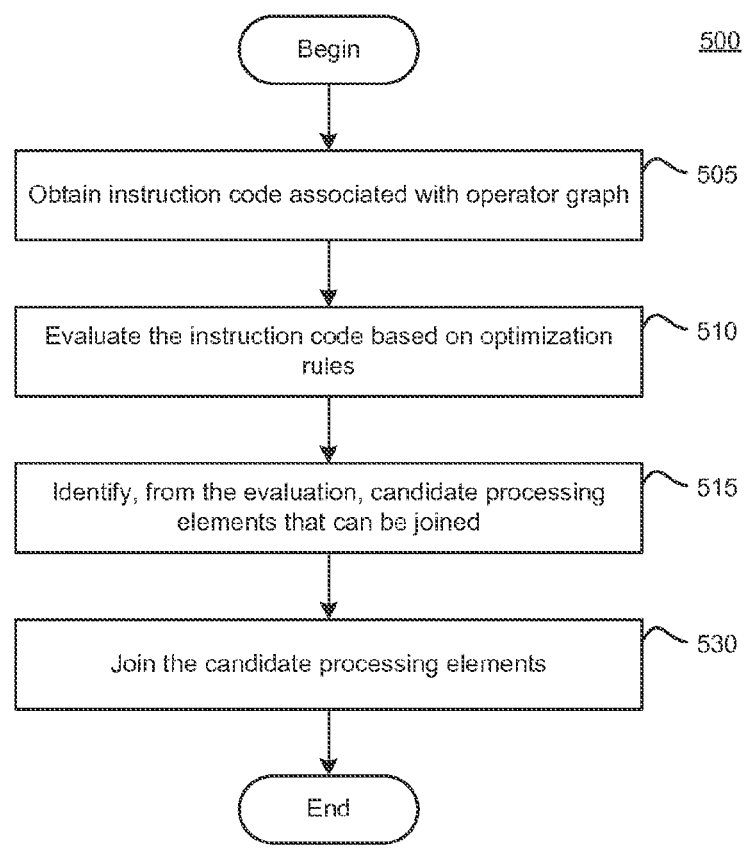
FIG. 5 illustrates a method for joining processing elements in an operator graph, according to one embodiment.

FIG. 5 illustrates a method 500 for optimizing an operator graph, according to one embodiment. As shown, method 500 begins at step 505, where the retrieval component 305 obtains instruction code associated with the operator graph. As stated, the IDE tool may generate instruction code and compiler artifacts, e.g., during compilation of the operator graph, when the developer saves the operator graph in the IDE tool, etc.

At step 510, the evaluation component 310 analyzes the instruction code based on one or more optimization rules. In particular, the evaluation component 310 may determine whether a set of processing elements in the operator graph comply with one or more of the optimization rules. For instance, assume that a given rule specifies that successive functor processing elements that transform different fields of a given stream of data should be merged. Also assume that, for processing elements 1 and 2 (of FIG. 4) are functor processing elements that transform different fields for a stream of data. The evaluation component 310 may determine that the processing elements 1 and 2 comply with that rule.

At step 515, the identification component 315 determines, from the evaluation, candidate processing elements that can be joined. In the previous example, the identification component 315 may determine that processing elements 1 and 2 can be joined. Further, in one embodiment, the identification component 315 may optionally generate an indication that the processing elements 1 and 2 can be joined. The IDE tool may present the indication to the developer, where the developer can choose whether to join the processing elements.

At step 520, the merge component 320 joins the candidate processing elements. As stated, the merge component 320 consolidates instruction code from two or more processing elements to be performed in a single processing element. Further, in one embodiment, during the development phase, the developer may select which of the candidate processing elements to join. In such a case, the merge component 320 receives the selection and merges those processing elements.

Figure 6:
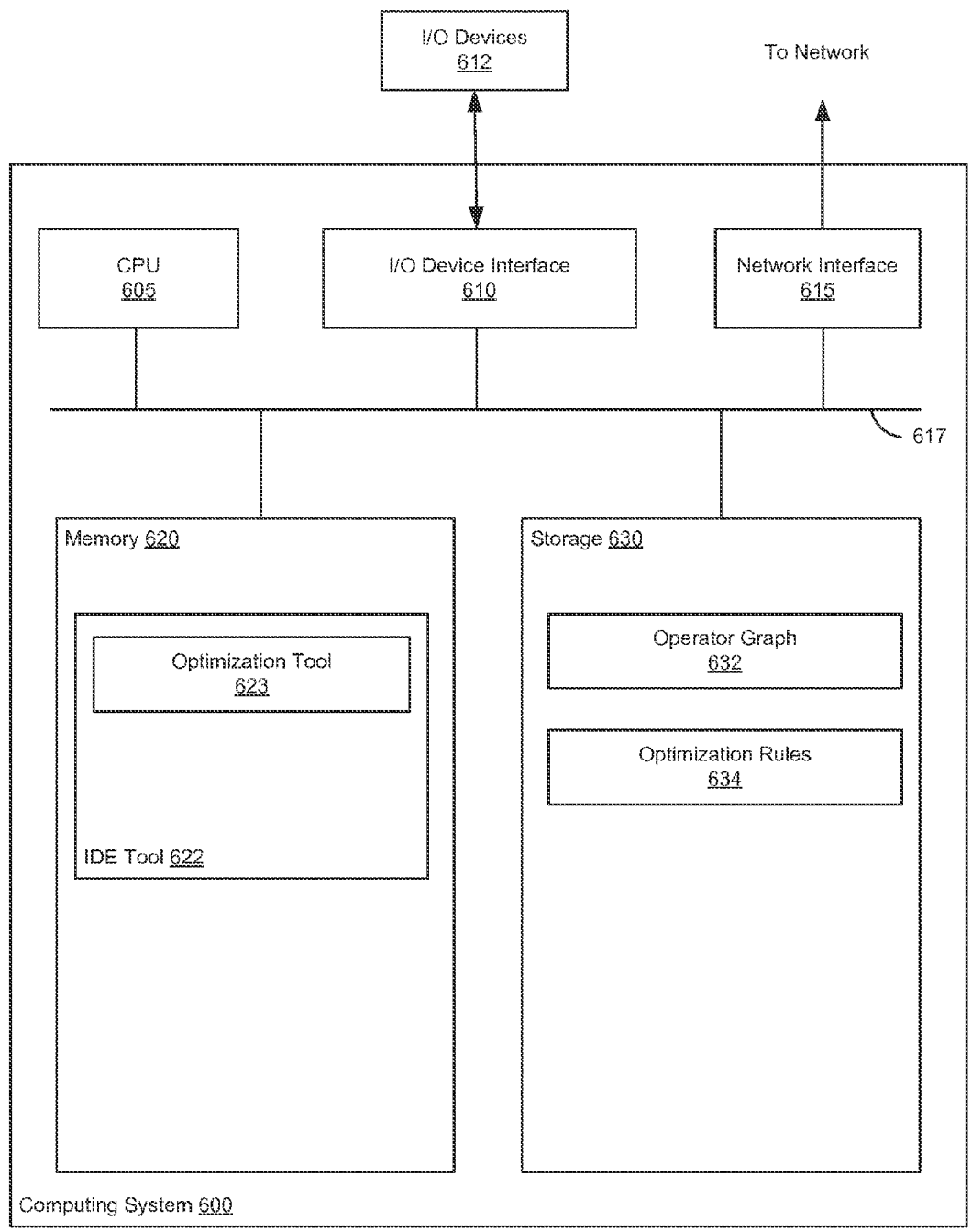
FIG. 6 illustrates an example computing system configured to join processing elements in an operator graph, according to one embodiment.

FIG. 6 illustrates a computing system 600 configured to join processing elements in an operator graph, according to one embodiment. As shown, the computing system 600 includes, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in the computing system 600 may correspond to a physical computing system.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an integrated development environment (IDE) tool 622. And storage 630 includes an operator graph 632 and one or more optimization rules 634. A developer uses the IDE tool 622 to design processing elements and operators in a streams processing environment. The IDE tool 622 itself includes an optimization tool 623. In one embodiment, the optimization tool 623 evaluates instruction code generated corresponding to the operator graph 632. Based on the evaluation, the optimization tool 623 identifies processing elements of the operator graph 632 that can be joined. The optimization tool 623 may join the identified processing elements. To do so, the optimization tool 623 may combine instruction code corresponding to each processing element such that the instruction code is performed by an individual processing element.

Further, the IDE optimization tool 623 may optionally indicate, e.g., to a developer, which of the processing elements may be joined. In such a case, the optimization tool 623 receives a selection of the identified processing elements. The optimization tool 623 then joins the selected processing elements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the IDE tool, the optimization tool, etc.) or related data available in the cloud. For example, the optimization tool could execute on a computing system in the cloud and determine which processing elements in an operator graph can be merged, e.g., via whole program optimization. In such a case, the optimization tool could determine processing elements that can be merged and store resulting instruction code at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of optimizing distributed applications by joining processing elements, the computer-implemented method comprising:
    analyzing respective instruction code of each of a plurality of processing elements of a distributed application, wherein the plurality of processing elements are organized in an operator graph, wherein the plurality of processing elements includes at least a first processing element and a second processing element, which are of distinct processing element types and which are not in succession relative to one another in the operator graph;
    precompiling the operator graph in order to save compiler artifacts corresponding to the first processing element and the second processing element, the compiler artifacts including instruction code and symbols, wherein the compiler artifacts are evaluated based on one or more specified rules;
    determining, by operation of one or more computer processors and based on at least one of the analysis and the evaluation, that the instruction code of the first processing element and the instruction code of the second processing element satisfy at least one optimization rule;
    upon determining that the at least one optimization rule is satisfied, joining the instruction code of the first processing element with the instruction code of the second processing element based on the at least one optimization rule and in order to generate a third processing element which includes at least some of the instruction code from both the first processing element and the second processing element; and
    deploying the distributed application, which includes the third processing element and excludes both the first processing element and the second processing element, thereby reducing a processing overhead incurred by the distributed application relative to inclusion of both the first processing element and the second processing element.

2. The computer-implemented method of claim 1, further comprising, prior to joining the instruction code of the first processing element with the instruction code of the second processing element:
    generating a suggestion to join the instruction code of the first processing element with the instruction code of the second processing element; and
    presenting the suggestion in an interface associated with the operator graph.

3. The computer-implemented method of claim 2, further comprising, prior to joining the instruction code of the first processing element with the instruction code of the second processing element:
    receiving, via the interface, a selection of the first processing element and the second processing element in response to the suggestion.

4. The computer-implemented method of claim 1, wherein the at least one optimization rule specifies that the instruction code of the first processing element should be joined with the instruction code of the second processing element based on at least one of (i) the type of the first processing element being compatible with the type of the second processing element and (ii) a function performed by the instruction code of the first processing element being compatible with a function performed by the instruction code of the second processing element.

5. The computer-implemented method of claim 1, wherein the plurality of processing elements are of a streams processing environment.

6. The computer-implemented method of claim 1, wherein analyzing the plurality of processing elements comprises:
    analyzing the instruction code of the first processing element relative to the instruction code of each of the other plurality of processing elements in the operator graph as the second processing element based on the at least one optimization rule.

7. The computer-implemented method of claim 1, wherein joining the first processing element with the second processing element comprises:
    merging the instruction code of the first processing element and the instruction code of the second processing element into the third processing element.

8. The computer-implemented method of claim 7, wherein the distributed application executes in a streams processing environment, the computer-implemented method further comprising:
    subsequent to merging the instruction code of the first and second processing elements into the third processing element, removing the first and second processing elements from the operator graph, wherein the distributed application is deployed to the streams processing environment.

9. The computer-implemented method of claim 8, wherein the instruction code of the plurality of processing elements is generated by a compiler, wherein the instruction code of the plurality of processing elements comprises executable instruction code.

10. The computer-implemented method of claim 1, wherein the computer-implemented method is performed by an optimization tool component of an integrated development environment (IDE) tool, wherein the optimization tool component comprises a plurality of subcomponents, the plurality of subcomponents including a retrieval subcomponent, an evaluation subcomponent, an identification subcomponent, and a merge subcomponent.

11. The computer-implemented method of claim 10, wherein the retrieval subcomponent is configured to obtain the respective instruction code of each of the plurality of processing elements;
    wherein the evaluation subcomponent is configured to analyze the respective instruction code of each of the plurality of processing elements;
    wherein the identification subcomponent is configured to determine that the instruction code of the first processing element and the instruction code of the second processing element satisfy the at least one optimization rule;
    wherein the merge subcomponent is configured to automatically join the instruction code of the first processing element with the instruction code of the second processing element in order to generate the third processing element.

12. The computer-implemented method of claim 11, wherein the plurality of processing elements are of a streams processing environment, wherein the computer-implemented method further comprises, prior to joining the instruction code of the first processing element with the instruction code of the second processing element:
    generating a suggestion to join the instruction code of the first processing element with the instruction code of the second processing element; and
    presenting the suggestion in an interface associated with the operator graph.

13. The computer-implemented method of claim 12, further comprising, prior to joining the instruction code of the first processing element with the instruction code of the second processing element, receiving, via the interface, a selection of the first processing element and the second processing element in response to the suggestion;
    wherein the at least one optimization rule specifies that the instruction code of the first processing element should be joined with the instruction code of the second processing element based on, in respective instances, each of (i) the type of the first processing element being compatible with the type of the second processing element and (ii) a function performed by the instruction code of the first processing element to a first field of a data tuple being compatible with a function performed by the instruction code of the second processing element to a second field of the data tuple.

14. The computer-implemented method of claim 13, wherein analyzing the plurality of processing elements comprises analyzing the instruction code of the first processing element relative to the instruction code of each of the other plurality of processing elements in the operator graph as the second processing element based on the at least one optimization rule;
    wherein joining the first processing element with the second processing element comprises merging the instruction code of the first processing element and the instruction code of the second processing element into the third processing element;
    wherein the computer-implemented method further comprising, subsequent to merging the instruction code of the first processing element and the second processing element into the third processing element, removing the first processing element and the second processing element from the operator graph, wherein the distributed application is deployed to the streams processing environment.

15. The computer-implemented method of claim 14, wherein the instruction code of the plurality of processing elements is generated by a compiler, wherein the instruction code of the plurality of processing elements comprises executable instruction code;
    wherein generating the third processing element in effect at least partially reduces re-execution of functionally redundant code common to the first processing element and the second processing element.

16. The computer-implemented method of claim 1, further comprising, prior to joining the instruction code of the first processing element with the instruction code of the second processing element:
    generating a suggestion to join the instruction code of the first processing element with the instruction code of the second processing element.

17. The computer-implemented method of claim 1, wherein the at least one optimization rule specifies that the instruction code of the first processing element should be joined with the instruction code of the second processing element based on the type of the first processing element being compatible with the type of the second processing element.

18. The computer-implemented method of claim 1, wherein the at least one optimization rule specifies that the instruction code of the first processing element should be joined with the instruction code of the second processing element based on a function performed by the instruction code of the first processing element being compatible with a function performed by the instruction code of the second processing element.

19. The computer-implemented method of claim 1, wherein the third processing element is generated by an integrated development environment (IDE) tool.

20. The computer-implemented method of claim 19, wherein the third processing element is generated by an optimization tool component of the IDE tool.

* * * * *